United States Patent Office 3,238,256
Patented Mar. 1, 1966

3,238,256
PREPARATION OF AROMATIC BORON DIHALIDES
Eric Francis Mooney and William Gerrard, London, England, assignors to F. W. Berk & Company Limited, London, England, a British company
No Drawing. Filed Aug. 15, 1963, Ser. No. 302,468
6 Claims. (Cl. 260—543)

This invention relates to aromatic boron compounds and is more particularly concerned with the provision of a process for the preparation of aromatic boron compounds and is a continuation-in-part of our co-pending application Serial No. 199,258, filed June 1, 1962, now abandoned.

Borisov, Chem. Abs., vol. 46, p. 2995 (1952), describes the synthesis of a few boron organic compounds of the ethylene series, in particular the reaction of chlorovinyl mercuric chloride with boron trichloride.

The present invention provides a process for the preparation of compounds of the formula YZ—B—$X_2$ where Z is an aromatic residue, e.g., a benzene, naphthalene, diphenyl or anthracene residue, Y is a hydrogen or halogen atom or an alkyl or aryl radical and each X is a halogen atom having an atomic weight of less than 90, i.e., a chlorine, bromine or fluorine atom, wherein a compound of the formula $BX_3$ is reacted with a compound of the formula YZHgX' where X, Y and Z have the meanings given above and X' is a halogen atom or a nitrate or acetate radical.

The present invention affords a simple process (in many instances involving mere mixing of the reactants) which readily lends itself to large scale manufacture. The Borisov reference is clearly and explicitly limited to boro-organic compounds of the ethylene series. The present invention involves more than mere substitution of aromatic mercuric halides for chlorovinyl mercuric chloride in Borisov. A chemist reading Borisov would find it impossible to predict with certainty the course which a Borisov type reaction would follow if used for the preparation of aromatic boron halides since the electronegativity of the metal atom for any given substituent cannot be forecast with certainty. Further, the electronic configuration of the chlorovinyl group and that of an aromatic residue are vastly different, and it would be expected therefore that their relative effects upon the mercury atom would be very different. Thus it is not obvious that a Borisov type reaction could be applied to aromatic systems to obtain good yields of aromatic boron halides. It is significant that in the 10 years since the Borisov reference became available to the public there has been no published suggestion that his reaction may be applied in the aromatic field, and this is the more striking in view of the wide and actively pursued research into the organoboron chemistry over the last decade.

Example of compounds which can be prepared according to the present invention are phenylboron dichloride, tolylboron dichlorides, chlorophenyl boron dichlorides, bromophenyl boron dichlorides, phenylboron dibromide, tolylboron dibromides, naphthylboron dichlorides, ethylbenzeneboron dichlorides and phenylboron bromide chloride.

Preferably the reaction is carried out in benzene or other inert solvent with heating under reflux. The reaction may be carried out at room temperature or at elevated temperatures if desired. In many cases the reaction may be carried out by merely contacting the reactants.

According to a preferred embodiment of the process of the invention boron trichloride or boron tribromide is reacted with an arylmercuric chloride or arylmercuric bromide.

Preferably the insoluble mercuric halide formed during reaction is removed (by filtration, or centrifuging and decanting, etc.) prior to isolating the desired product. If desired, however, the reaction product may be distilled to yield a distillate containing a phenyl boron halide and a residue containing the mercuric halide plus a small amount of a phenyl boron halide, the residue may then be extracted with an inert organic solvent to afford insoluble mercuric halide, the organic solvent fraction then being processed for further phenyl boron halide (see Example 3 below).

Mixed phenyl boron halides may be prepared by using mixtures of phenyl mercury halides as starting materials, in addition to the boron halide reactant. Equally, if aromatic boron halides having different halogen atoms attached to the boron atom are required, rather than react an aryl mercury compound with a boron trihalide the halogen atoms of which are different (such as boron bromide dichloride), it is preferred to employ a reactant of the general formula YZHgX' in which X' is a halogen atom different from X of the reactant $BX_3$, as illustrated in Example 18 below. Thus an aryl boron bromide chloride may be prepared either by reacting boron trichloride with an aryl mercuric bromide or by reacting boron tribromide with an aryl mercuric chloride.

The reaction need not be carried out in an enclosed atmosphere.

The compounds prepared by the process of the present invention are useful intermediates for the production of arylboronic acids of the general formula:

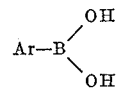

arylboronic anhydrides of the general formula

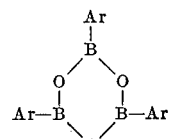

and arylboronic esters of the general formula

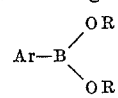

where Ar is an aryl residue and R is an alkyl, aryl or alkenyl radical.

The compounds prepared by the process of the present invention are also useful reagents in the preparation of oxaboroles, azoboroles and mixed oxazo-boroles. They also find important applications in the production of semi-inorganic polymers of the general formula

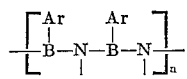

where $n$ is an integrer greater than one.

The following examples illustrate the invention.

*Example 1*

Boron trichloride (29.33 g., 1.21 mol.) at —80° C. was added to phenylmercuric chloride (66.20 g., 1.0 mol.) in benzene (250 ml.) and the reaction mixture was maintained at reflux temperature for 12 hours. The insoluble mercuric chloride (54.49 g., 97.1% yield) (found: Hg, 72.6; calc. for $HgCl_2$: Hg, 73.8%) was filtered off. The benzene was removed from the filtrate under reduced pressure and the residue fractionally distilled to afford phenylboron dichloride (25.44 g., 75.7% yield), B.P. 70–72° C./10 mm. (Found: B, 6.9; Cl, 44.3. Calc. for C$_6$H$_5$BCl$_2$: B, 6.8; Cl, 44.6%).

*Example 2*

Phenylmercuric chloride (66.74 g., 1.0 mol.) and boron trichloride (71.02 g., 2.86 mol.) were reacted as in Example 1 for 10 hours, the excess boron trichloride (38.4 g., 1.54 mol.) was distilled off and trapped (−80° C.). The insoluble mercuric chloride (55.46 g., 76% yield) (found: Hg, 73.2%) was filtered off and after removal of benzene from the filtrate, fractional distillation afforded phenylboron dichloride (22.89 g., 68% yield) B.P. 69–71° C./10 mm. (found: Cl, 44.4%).

*Example 3*

Phenylmercuric chloride (66.7 g., 1.0 mol.) was heated with boron trichloride (65.57 g., 2.63 mol.) under reflux (11 hours) in the absence of solvent. The excess boron trichloride (43.4 g., 1.74 mol.) was distilled off and trapped (−80° C.). The residue, consisting of white needles and a dark-brown liquid, was distilled to afford phenylboron dichloride (6.34 g., 18.7% yield) (found: Cl, 44.3%). The distillation residue (79.69 g.) was extracted with dry benzene to afford an insoluble brownish-white solid consisting essentially of mercuric chloride (56.43 g., 97.67% yield) (found: Hg, 70.3%) which was filtered off. Evaporation of the benzene (10 mm.) from the filtrate and distillation afforded further phenylboron di-chloride (9.81 g., total yield, 47.7%), B.P. 100–120° C./70 mm. (found: B, 6.9; Cl, 43.8). The distillation residue consisted of a mixture of phenylboron dichloride and phenylboronic anhydride (found: B, 7.1; Cl, 21.6%).

*Example 4* p-Tolylmercury chloride (44.38 g., 1.0 mol.) and boron trichloride (1.0 mol.) were heated at reflux temperature in benzene (300 ml.) for 10 hours. The mercuric chloride (34.46 g., 93.8% yield) (found: Hg, 73.1%) was filtered off and dried. The benzene was removed (10 mm.) from the filtrate and the residue fractionally distilled to afford p-tolylboron dichloride (17.15 g., 73.4% yield), B.P. 92° C./10 mm., M.P. 30° C. (Found: B, 6.5; Cl, 41.2. Calc. for C$_7$H$_7$BCl$_2$: B, 6.3; Cl, 41.0%).

*Example 5* p-Chlorophenylmercury chloride (40.48 g., 1.0 mol.) and boron trichloride (29.73 g., 2.18 mol.) were heated in benzene (300 ml.) at reflux temperature for 15 hours. The excess of boron trichloride (4.84 g., 0.36 mol.) was distilled off and trapped at −70° C. and the mercuric chloride (30.13 g., 95.3% yield) (found: Hg, 70.6%) was filtered off. The benzene was removed (10 mm.) from the filtrate and fractional distillation of the residue afforded p-chlorophenylboron dichloride. (Found: B, 5.6; e.h. Cl, 36.6. C$_6$H$_4$BCl$_3$ requires B, 5.6 e.h. Cl, 36.7%.)

*Example 6* m-Tolylmercury chloride (52.8 g., 1.0 mol.) and boron trichloride (18.9 g., 1.0 mol.) were heated at reflux temperature in benzene (250 ml.) for 8 hours. The mercuric chloride (41.8 g.) was filtered off and distillation of the filtrate, after removal of the benzene, gave m-tolylboron dichloride (22.2 g., 80% yield), B.P. 82–84° C./23 mm. (Found: B, 6.3; Cl, 41.0. C$_7$H$_7$BCl$_2$ requires B, 6.3; Cl, 41.0%.)

*Example 7* o-Tolylmercury chloride (97.66 g., 1.0 mol.) and boron trichloride (1.0 mol.) were heated in benzene at reflux temperature for 10 hours. After cooling the solution was filtered to afford mercuric chloride (78.06 g., 96.3% yield) (found: Hg, 66.6%; calc. for HgCl$_2$: Hg, 73.9%). Removal of the benzene and distillation of the filtrate afforded an impure product (34.87 g., 67.6%) (found: B, 6.12%; Cl, 40.2%), B.P. 84–90° C./10 mm., which on redistillation afforded pure o-tolylboron dichloride (26.39 g., 51.2% yield) (found: B, 6.2%; Cl, 40.4%; calc. for C$_7$H$_7$BCl$_2$: B, 6.2%; Cl, 41.0%), B.P. 88–92° C./12 mm., $n_D^{20}$ 1.5499; $d_4^{20}$ 1.204.

*Example 8*

Phenylmercury nitrate (67.52 g., 1.0 mol.) and a slight excess of boron trichloride were heated under reflux in benzene (250 ml.) for 8 hours. The solution was filtered to remove the insoluble mercury salts (54.80 g.) (found: Hg, 73.0%). The benzene was removed from the filtrate (0.1 mm.) and distillation of the residue gave a fraction (12.34 g.), B.P. 80–90° C./15 mm. (found: Cl, 30.4%) of a mixture of phenylboron dichloride and nitrobenzene. The distillate (11.6 g.) was hydrolysed with sodium hydroxide solution and ether extracted to give nitrobenzene (1.85 g.) B.P. 206° C. (confirmed in infrared). Acidification of the aqueous solution gave phenylboronic acid (3.62 g.) (found: B, 8.7; calc. for C$_6$H$_7$OB: B, 8.9%) which was filtered off and dried (0.1 mm.).

*Example 9* p-Bromophenylmercury chloride (94.7 g., 1.0 mol.) and boron trichloride (1.0 mol.) were heated in benzene (300 ml.) for 10 hours. The insoluble mercuric chloride (68.2 g., 1.04 mol.) (found: Hg, 64.3%; calc. for HgCl$_2$: Hg, 73.9%) was filtered and fractional distillation of the filtrate afforded an impure product (34.06 g., 59.3%) (found: Cl, 28.8%), B.P. 60–80° C./2.0 mm., which on redistillation afforded p-bromophenylboron dichloride (12.46 g., 21.7%) (found: B, 4.6%; Cl, 29.6%; calc. for C$_6$H$_4$BBrCl$_2$: B, 4.6%; Cl, 29.8%), B.P. 54–60° C./0.4 mm.

*Example 10*

Boron tribromide (46.29 g., 1.01 mol.) was added dropwise to a suspension of phenylmercuric bromide (65.30 g., 1.0 mol.) in benzene (250 ml.) and the mixture maintained at reflux temperature for 12 hours. The insoluble mercuric bromide (62.92 g., 95.6% yield) (found: Hg, 55.4%; calc. for HgBr$_2$: Hg, 55.6%) was filtered. The solvent was removed from the filtrate (0.1 mm.) and the residue fractionally distilled to afford phenylboron dibromide (19.48 g., 43.1% yield) (found: B, 4.3%; Br, 64.1%; calc. for C$_6$H$_5$BBr$_2$: B, 4.4%; Br, 64.5%), B.P. 94–104° C./15 mm.

*Example 11*

Boron tribromide (49.99 g., 1.02 mol.) was added dropwise to a suspension of p-tolylmercuric bromide (72.06 g., 1.0 mol.) in benzene, and heated under reflux for 35 hours; hydrogen bromide was evolved and the solution became dark coloured. The solution was filtered free from mercuric bromide (67.77 g., 96.3% yield) (found: Hg, 54.6%; calc. for HgBr$_2$: Hg, 57.2%) which was obtained as a black solid and was extracted with water in a Soxhlet extraction apparatus to afford white crystalline mercuric bromide (53.41 g.) (found: Hg, 55.2%). The filtrate, after removal of the solvent, was fractionally distilled to afford an impure product (13.47 g., 26.3% yield) (found: B, 3.81%; Br, 57.5%), B.P. 82–84° C./0.2 mm., which on redistillation gave pure p-tolylboron dibromide (10.8 g.) (found: B, 4.0%; Br, 59.8%; calc. for C$_7$H$_7$BBr$_2$: B, 4.1%; Br, 61.1%), B.P. 64° C./0.1 mm.

*Example 12*

Boron trichloride (2.0 mol.) and α-naphthylmercuric chloride (45.53 g., 1.0 mol.) were shaken in benzene for 50 hours. The solution was filtered to afford insoluble mercuric chloride (33.20 g., 97.5% yield) (found: Hg, 64.5%). The solvent was removed from the filtrate (0.1 mm.) to afford a residue (21.88 g.) which was distilled to afford an impure α-naphthylboron dichloride (10.03 g., 38% yield) (found: B, 5.9%; Cl, 30.0%; calc. for C$_{10}$H$_7$BCl$_2$: B, 5.18%; Cl, 33.9%), B.P. 140–180° C./0.3 mm. The product could not be further purified, but derivatives could easily be prepared. The dichloride (3.12 g., 1.0 mol.) in benzene (5 ml.) was added dropwise to a solution of catechol (1.71 g., 1.04 mol.) in the same solvent (50 ml.). The benzene solution was heated under reflux for 12 hours until evolution of hydrogen chloride had ceased and benzene removed (0.1 mm.). The residue was recrystallised thrice from petroleum ether (60–80° C.) using activated charcoal to decolorise the product to afford white 2-α-naphthyl-5,6-benzo-2,3-boroxo-coumarone (1.63 g., 44.3% yield). (Found: C, 78.1%; H, 4.5%; B, 4.3%. $C_{16}H_{11}BO_2$ requires C, 78.1%; H, 4.5%; B, 4.4%.)

Similarly the dichloride (4.52 g., 1.00 mol.) and 2,3-dihydroxynaphthalene reacted as above and heated under reflux for 15 hours afforded 2-α-naphthyl-5,6-naphthyl-2,3-boroxocoumarone (5.60 g., 87.4%) (found: C, 81.1%; H, 4.4%; B, 3.6%; $C_{20}H_{13}BO_2$ requires C, 81.1%; H, 4.4%; B, 3.7%), M.P. 221–224° C.

Example 13

To mixed o- and p-ethylbenzenemercuric chlorides (280.0 g.) in benzene (800 ml.) was added boron trichloride (150.0 g.) in the same solvent (300 ml.) and the solution maintained at reflux temperature for 18 hours. Filtration of the insoluble mercuric chloride (216.0 g.) (found: Hg, 71.9%) and fractional distillation of the filtrate, after removal of benzene, afforded the fractions: (i) (9.12 g.) (found: Cl, 9.8%), B.P. 50–64° C./13 mm. of a mixture of ethylbenzene and mixed ethylbenzene-boron dichlorides, (ii) (60.40 g., 39.0% yield) (found: B, 5.7%; Cl, 37.4; calc. for $C_8H_9BCl_2$: B, 5.8%; Cl, 37.9%), B.P. 100–104° C./12 mm., which was a mixture of o- and p-ethylbenzeneboron dichlorides. (The lower yield was due to commercial bromoethylbenzene being used without further purification.)

Example 14

Phenylmercury chloride (62.62 g., 1.0 mol.) in benzene (50 ml.) and boron trichloride (25 g.) were shaken in a stoppered flask for 30 mins. The insoluble mercuric chloride (54.30 g.) (found: Hg, 73.1%) was filtered off and distillation of the filtrate afforded phenylboron dichloride (28.95 g., 90% yield) (found: B, 6.7; Cl, 44.6%), B.P. 80–81° C./25 mm.

Example 15

Boron trichloride (1.0 mol.) was added to a suspension of m-chlorophenylmercury chloride (29.0 g., 1.0 mol.) in dry benzene (150 ml.) and shaken at room temperature for 4 hours. Filtration and washing with petroleum (B.P. 30–40° C.) afforded insoluble mercuric chloride (19.9 g., 88% yield) and removal of solvent (at 10 mm.) from the filtrate afforded a red-brown liquid (13.6 g., 84% yield) which on distillation gave a colourless fraction of m-chlorophenylboron dichloride, B.P. 60–62° C./0.5 mm. (found: B, 5.8%; Cl (e.h.) 36.7%); calc. for $C_6H_4BCl_3$: B, 5.6%; Cl (e.h.) 36.7%), $n_D^{20}$ 1.5619; $d_4^{20}$ 1.3565.

Example 16

Boron trichloride (1.0 mol.) and p-ethylphenylmercuric chloride (155 g.) were treated as in Example 15 to afford p-ethylphenylboron dichloride (25.1% yield) (found: B, 5.7%; Cl, 37.7%; calc. for $C_8H_9BCl_2$: B, 5.8%; Cl, 37.9%), B.P. 80–82° C./1 mm., $n_D^{20}$ 1.5422, $d_4^{20}$ 1.1273.

Example 17

Boron trichloride (1 mol.) and o-ethylphenyl mercuric chloride (900 g., 1.0 mol.) were stirred at room temperature in 150 ml. of dry benzene for 5 hours and afforded mercuric chloride (698 g.) (found: Hg, 72.5%) and removal of solvent from the filtrate and fractional distillation give o-ethylphenylboron dichloride (207.6 g., 42.1% yield) (found: B, 5.8%; Cl, 37.7%; calc. for $C_8H_9BCl_2$: B, 5.8%; Cl, 37.9%), B.P. 90–94° C./10mm., $n_D^{20}$ 1.5386; $d_4^{20}$ 1.1562.

Example 18

Phenylmercuric chloride (71.85 g., 1.0 mol.) and boron tribromide (57.36 g., 1.0 mol.) were heated under reflux in benzene (250 ml.); the mercuric bromide (80.67 g., 97.6%) found: Hg, 55.3; calc. for $HgBr_2$: Hg, 55.6%) was filtered off, and the filtrate afforded phenylboron bromide chloride (25.30 g., 54.3%) (found: C, 35.6; H, 2.7; B, 5.5; Br, 39.0; Cl, 17.6. $C_6H_5BBrCl$ requires C, 35.5; H, 2.5; B, 5.3; Br, 39.3; Cl, 17.4%), B.P. 68–70° C./10 mm.

What is claimed is:
1. A process for the preparation of compounds of the formula YZ—B—$X_2$, where Z is an aromatic hydrocarbon residue, Y is a member selected from the group consisting of hydrogen and halogen atoms and alkyl and aryl radicals and each X is a halogen atom having an atomic weight of less than 90, which comprises reacting at least one mol of a compound of the formula $BX_3$ per mol of a compound of the formula YZHgX′, where X, Y and Z have the meanings given above and X′ is selected from the group consisting of halogen atoms and nitrate radicals.
2. A process according to claim 1 in which the reaction is carried out in an inert solvent and under reflux.
3. A process for the preparation of an aryl boron dichloride which comprises reacting at least one mol of boron trichloride per mol of an aryl mercuric chloride.
4. A process for the preparation of an aryl boron bromide chloride which comprises reacting at least one mol of boron trichloride per mol of an aryl mercuric bromide.
5. A process for the preparation of an aryl boron bromide chloride which comprises reacting at least one mol of boron tribromide per mol of an aryl mercuric chloride.
6. A process for the preparation of an aryl boron dibromide which comprises reacting at least one mol of boron tribromide per mol of an aryl mercuric bromide.

References Cited by the Examiner

Michaelis et al.: Chem. Ber., vol. 13, 1880, pp. 58–59.
Gerrard et al.: Chem. Rev., vol. 56, 1958, p. 1106.

LORRAINE A. WEINBERGER, *Primary Examiner.*